(12) United States Patent
Rabinovich

(10) Patent No.: US 6,700,892 B1
(45) Date of Patent: Mar. 2, 2004

(54) COMMUNICATION SYSTEM FOR E1/T1

(75) Inventor: Michael Rabinovich, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 749 days.

(21) Appl. No.: 09/603,134

(22) Filed: Jun. 23, 2000

(30) Foreign Application Priority Data

Mar. 16, 2000 (IL) ................................................ 135118

(51) Int. Cl.$^7$ ............................................. H04L 12/28
(52) U.S. Cl. ...................... 370/403; 370/404; 370/420; 370/452
(58) Field of Search ................................ 370/352, 354, 370/359, 360, 376, 389, 401, 405, 413, 415, 417, 420, 537, 364, 403, 404, 406, 419, 421, 422, 424, 450, 452, 458, 460

(56) References Cited

U.S. PATENT DOCUMENTS 6,058,111 A * 5/2000 Beyda et al. ................ 370/360
6,208,664 B1 * 3/2001 Plummer et al. ............ 370/480
6,351,452 B1 * 2/2002 Koenig et al. ............... 370/217

\* cited by examiner

*Primary Examiner*—Phirin Sam
(74) *Attorney, Agent, or Firm*—Nath & Associates PLLC; Harold L. Novick; Derek Richmond

(57) ABSTRACT

A method of exchanging data streams between a local exchange and a number of access devices for serving a plurality of destination users, the method comprises the steps of: (a) providing a local exchange capable of generating at least one output data stream and of receiving at least one corresponding input data stream for carrying data blocks respectively relevant to one or more of the access devices; (b) providing two or more said access devices, each permitting passage there-through of at least one data stream carrying data blocks, being capable of extracting, from said at least one data stream, data blocks relevant to this particular device and of introducing there-into data blocks to be transmitted from this particular device to the local exchange; and (c) arranging one or more close loop data streams, each being intended for serving said two or more access devices using one of said output data streams and the corresponding input data stream of the local exchange, by causing the output data stream leaving the local exchange to pass through said two or more access devices in a chain-like manner and return to the local exchange as the input data stream.

15 Claims, 6 Drawing Sheets

COMMUNICATION SYSTEM FOR E1/T1

FIELD OF THE INVENTION

The field of the invention relates in general to communication systems. More particularly, the invention relates to a system for distributing to a plurality of users information coming from E1 or T1 links.

BACKGROUND OF THE INVENTION

The E1 and T1 multiplexing systems are widely used in the field of communication for transmitting data in a digital form from one location to another. In many cases, the digital data that is transferred over the El or T1 carrier represents the human voice, such as a telephone call, or a general analogue signal, that is transformed, e.g., by Pulse Code Modulation (PCM) into digital form. In other cases of growing frequency in recent years, the E1 and T1 links are used for transferring digital data between computer systems or computer users in remote locations.

The E1 multiplexing system that is mostly used in Europe comprises Time Divisional Multiplexing of up to 31 individual channels of data (hereinafter also referred to as "time slots" or "slots"), while the T1 multiplexing system that is mostly used in the USA comprises Time Divisional Multiplexing of up to 24 individual channels of data. The Time Divisional Multiplexed data in the E1 or T1 carriers is generally data that is sampled from a plurality of individual sources, then serially grouped into frames, wherein each data slot in a frame relates to a different channel and generally includes data from a different source.

In a typical digital access network, a local exchange (LE) is connected to an Access System, which in turn comprises a plurality of Access Devices. The communication between the LE and the Access System is based on E1/T1 links, which serve as the media for transmitting/receiving the users' voice/data and signaling information. The modern Access Devices that use CCS (Common Channel Signaling) protocols such as V.5.2 or GR303 enable connections between a large number of users to the LE by assigning one or more time slots in each frame for signaling information and supporting the allocation of the rest of the users' data to the E1s data slots on a per call basis, allowing the connection of a large number of users to the LE by E1 bundle.

The Access Devices of the prior art use "classical" point-to-point connection of their E1 links to the LE, wherein each E1 transceiver of any Access Device is connected to a corresponding E1 transceiver of the LE. Since each Access Device is able to support a finite number of users, the full utilization of the Local Exchange capabilities to support a few thousands of users requires additional links between LE and new Access Devices, and additional connections between Access Devices, which leads to an increase of the cost, installation and management difficulties and data delays.

It is therefore an object of the invention to provide an E1 or T1 system that is relatively simple, even when the number of users and/or the number of E1/T1 links is high.

It is another object of the invention to provide an E1/T1 system that is integral, i.e., a system that can be easily expanded to serve more users and/or E1/T1 links, without adding to its complexity.

It is still another object of the invention to reduce the number of transceivers in the system, while increasing the usage of each existing transceiver.

It is still another object of the invention to decrease the total data transfer delay in the system, by reducing the data delays due to the need to transfer specific data blocks between different Access Devices.

It is still another object of the invention to reduce the number of connections in the system and the switching complexity.

Other objects and advantages of the invention will become apparent as the description proceeds.

SUMMARY OF THE INVENTION

The invention relates to a method of exchanging data streams between a local exchange and a number of access devices for serving a plurality of destination users, the method comprising steps of: (a) providing a local exchange capable of generating at least one output data stream and of receiving at least one corresponding input data stream for carrying data blocks respectively relevant to one or more of the access devices; (b) providing two or more said access devices, each permitting passage there-through of at least one data stream carrying data blocks, being capable of extracting from said at least one data stream data blocks relevant to this particular device, and of introducing there-into data blocks to be transmitted from this particular device to the local exchange; (c) arranging one or more close loop data streams, each being intended for serving said two or more access devices using one of said output data streams and the corresponding input data stream of the local exchange, by causing the output data stream leaving the local exchange to pass through said two or more access devices in a chain-like manner and return to the local exchange as the input data stream.

Preferably, each of said data streams is a stream comprising data frames carrying the data blocks arranged in time slots. A pair of said input stream and said corresponding output stream of the local exchange forms one E1 link. Alternatively, a pair of said input stream and corresponding to it said output stream forms one T1 link.

According to the most preferred version of the method, the step of arranging one or more close loop data streams is performed by chain-like interconnecting the access devices situated in different access systems.

As will be further explained in detail, the access device is preferably a user interface card, and the access system is an access shelf adapted to contain a number of the user interface cards.

Preferably, the method of the invention further comprises a step of forwarding the extracted data blocks from each said access device to the respective destination users, and a step of receiving, at each said access device, data blocks to be transmitted from the respective destination users to the local exchange.

Preferably, the said step of forwarding the extracted data blocks to destination users comprises a sub-step of passing thereof from at least one of said access devices named a master device via a slave access device to the destination users associated therewith, as well as a sub-step of receiving data blocks intended for transmission from the destination users associated with the slave device, thereby increasing the number of the destination users served by the master device.

The invention further relates to a system for exchanging data streams between a local exchange and a number of access devices for serving a plurality of destination users, the system comprising: (a) a local exchange having at least one transceiver capable of generating one output data stream and of receiving a corresponding input data stream for carrying data blocks respectively relevant to one or more of the access devices; (b) two or more of said access devices, wherein each particular device has at least one transceiver permitting passage through the device of a data stream carrying data blocks, the device being capable of extracting from the stream data blocks relevant to the particular device, and of introducing into the stream data blocks to be transmitted from the particular access device to the local exchange; said two or more access devices being arranged in at least one chain, each of the chains to be served in a close loop by at least one of said transceivers of the local exchange, said close loop being formed by connecting the output of the transceiver of the local exchange to the input of the transceiver of a first device in the chain, the output of the transceiver of a last device in the chain is connected to the input of the transceiver in the local exchange, wherein the output of the first device in the chain being connected to the input of the transceiver of a last device in the chain either directly or in a chain-like manner via intermediate access devices if present in the chain.

According to the most preferred embodiment of the system, said at least one chain is composed from chain-like interconnected said access devices situated in different access systems.

Preferably, the access device is a user interface card, and the access system is an access shelf adapted to contain a number of the user interface cards.

According to the most preferred two embodiments of the inventive system, it is intended for E1 multiplexing system, or for T1 multiplexing system. Preferably, said access device comprises: (a) a block of per-channel loop-back comprising an input buffer for receiving at least one data frame, an output buffer for storing and transmitting at least one frame, means for extracting from the input buffer relevant data blocks from one or more time slots, means for forwarding the contents of the input buffer to the output buffer after extraction, and means for embedding, into vacant time slots of the output buffer, data blocks received by the access device from destination users for transmission; (b) a time-slot interchange switch unit for routing the extracted data blocks to the destination users and routing data blocks from the destination users to the output buffer block.

According to one variation of the invention, at least one of said access devices in the chain constitutes a master device which is provided with one or more additional access devices serving destination users and constituting slave devices; said master device being adapted to extract and transfer to any particular slave access device data blocks intended to destination users of the particular slave device, as well as to receive data blocks intended for transmission from destination users of the slave devices.

Preferably, the said master device is adapted to communicate with said one or more slave devices via a time slot interchange switch.

DETAILED DESCRIPTION OF PREFERRED EMBODIMENTS

Figure 1:
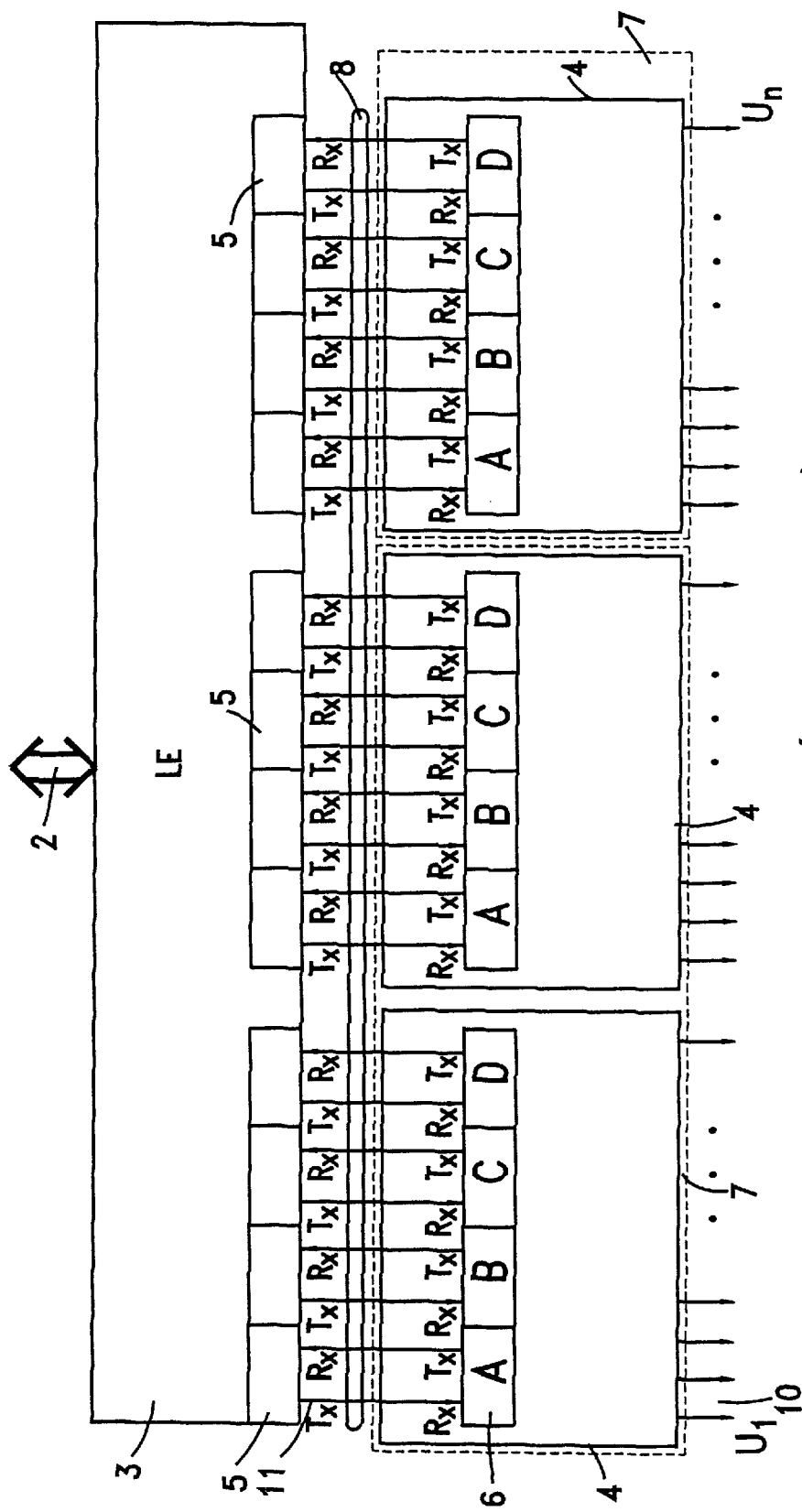
FIG. 1 illustrates an E1/T1 system according to the prior art.

FIG. 1 (prior art) shows the basic structure of a prior art Access Network including a Local Exchange 3 and a number of shelves 7 which may further be referred to as Access Systems (AS) 7. Each of the shelves 7 comprises a plurality of Access Devices (cards) 4; each access device is usually connected by means of a number of E1 links 11 to a Local Exchange (LE) 3. The local Exchange 3 receives and transmits information from/to a telecom trunk via communication links 2, that may be of any type. The Local Exchange 3 has a number of E1 links 11 connected to Access Devices, while each link from the LE is connected to a specific E1 transceiver 6 of an Access Device 4. In the example of FIG. 1, it is shown that each Access Device comprises four E1 transceivers 6; however this is only an example, as each Access Device 4 may comprise a greater or lesser number of E1 transceivers 6. A plurality of E1 links 11 between the Local Exchange and the shelves forms an access interface (or an access interface bundle), and is schematically marked 8. For example, the access interface may use the V.5.2 protocol.

Figure 3:
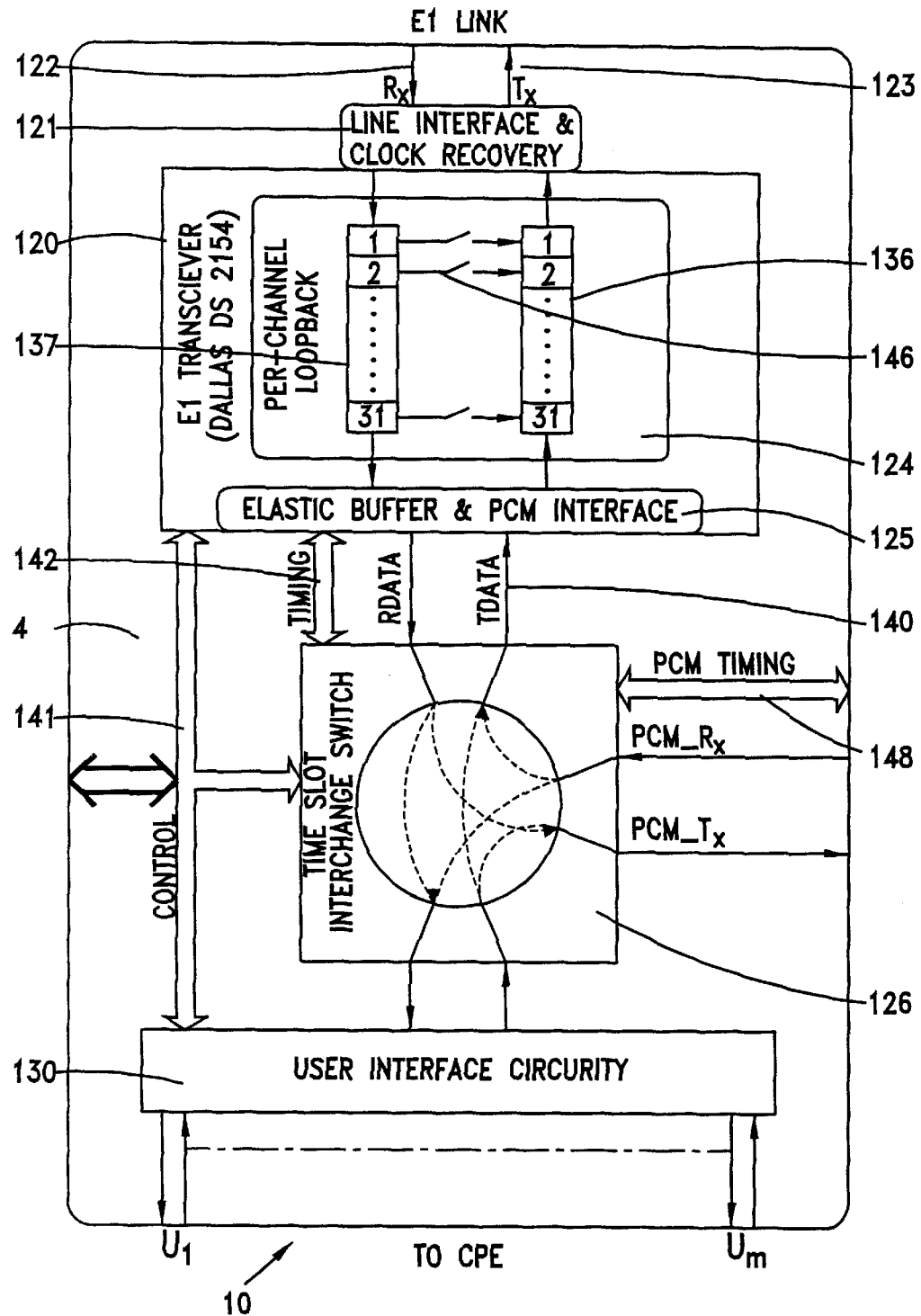
FIG. 3 (prior art) shows a user interface card (so called Access Device) which is to be installed in a shelf (so called Access System)

To understand how the prior art system works, FIG. 1 should be considered together with FIG. 3.

In the downstream direction (from the LE to the AS), the data is first transmitted from an E1 transceiver 5 of the LE 3, and received by an E1 transceiver 6 of the of the Access Device 4, which provides it into a time slot interchange switch 126 (FIG. 3) that selects and forwards the data blocks intended for users of this Access Device to a user interface circuitry 130 (not shown in FIG. 1), that in turn communicates it to a destination user Ui from the plurality of users U1 to Um, generally via a CPE interface (not shown). Data blocks of the particular communication are filled into time slots of the data stream as far as the connection lasts between the user and the Local Exchange. At the end of the connection between the LE and the destination user Ui, this data block is released, and its time slot can now be used for transferring data between another source and destination. In the upstream direction (from the AD to the LE), if a user Ui wishes to transfer data via an E1 link 2 to a remote destination, the user provides the data via the CPE interface to the Access Device 4, that multiplexes data that is received also from other users 10 of this card, to an E1 frame, and in turn provides it to the Local Exchange box 3. As previously, a channel in an E1 frame for the connection between a source and destination remains assigned to this connection as long as this specific data transfer has not been completed. The management of the above process, which is partially carried out by the Local Exchange 3 and partially by Access Device 4, is known in the art, and is not included in the scope of this invention.

As seen in FIG. 1, in the above prior art structure, each transceiver in the Local Exchange 3 is connected to a corresponding transceiver of one of the Access Devices 4. Therefore, the number of the active transceivers 5 in the LE is equal to the total number of the active transceivers 6 in all the Access Devices. Of course, as the number of users (schematically marked 10) increases, the number of Access Devices 4 has to increase, and the number of E1 transceivers 5 in the Local Exchange box 3 should increase. In addition, each Access Device (card) 4 usually communicates only with its assigned users 10 on the one hand and with the Local Exchange box 3 on the other hand. There is no E1 data communication between the individual Access Device cards themselves.

The main problem in the prior art system is how an Access Device 4 can deal with a data block that is received from an E1 link and is destined for a user of another Access Device 4. A special mechanism should therefore be provided in the prior art system for transferring such blocks to the appropriate Access Device 4. Such a mechanism is generally complicated, and causes delays in the transfer, until the data block transfer is completed from the first receiving Access Device to the correct destination Access Device.

A problem arises when it is needed to expand the system to serve more and more end users 10. The Access Device card has a limited number of E1 transceivers and can support only a limited number of users 10. In order to increase the capacity of the AS, an increased number of the Access Devices 4 must be connected to the LE 3. For example, the V5.2 access interface that is commonly used for interfacing between a local exchange and an access network (which includes a number of shelves connected to a plurality of users) can handle up to 16 E1 links, and may support a few thousands of users. (Another interface protocol GR 303 is capable of handling up to 28 T1 links.) A typical shelf (Access System) supports, for example, only 10 E1 links and 300 users. Therefore, it is needed to connect about 10 Access Systems to the LE 3, in order to handle the servicing of all potential users, i.e. to utilize the full capability of the LE interface.

As said, in the prior art system, each active E1 transceiver 5 of the LE is connected to a corresponding E1 transceiver 6 of the Access Device 4, and therefore the number of the active E1 transceivers 5 of the LE has to be equal to the number of the active E1 transceivers 6 of the Access Devices 4. The system of the present invention provides a more efficient way of connecting the E1 transceivers 5 of the LE to the E1 transceivers 6 of the Access Devices 4. According to the present invention, a few E1 transceivers 5 of the LE can support many Access Device cards 4 (with many users 10). According to the invention, the number of Access Device cards 4 that can be supported by the system does not depend on, and is not limited by, the number of E1 transceivers 5 of the LE 3.

Figure 2:
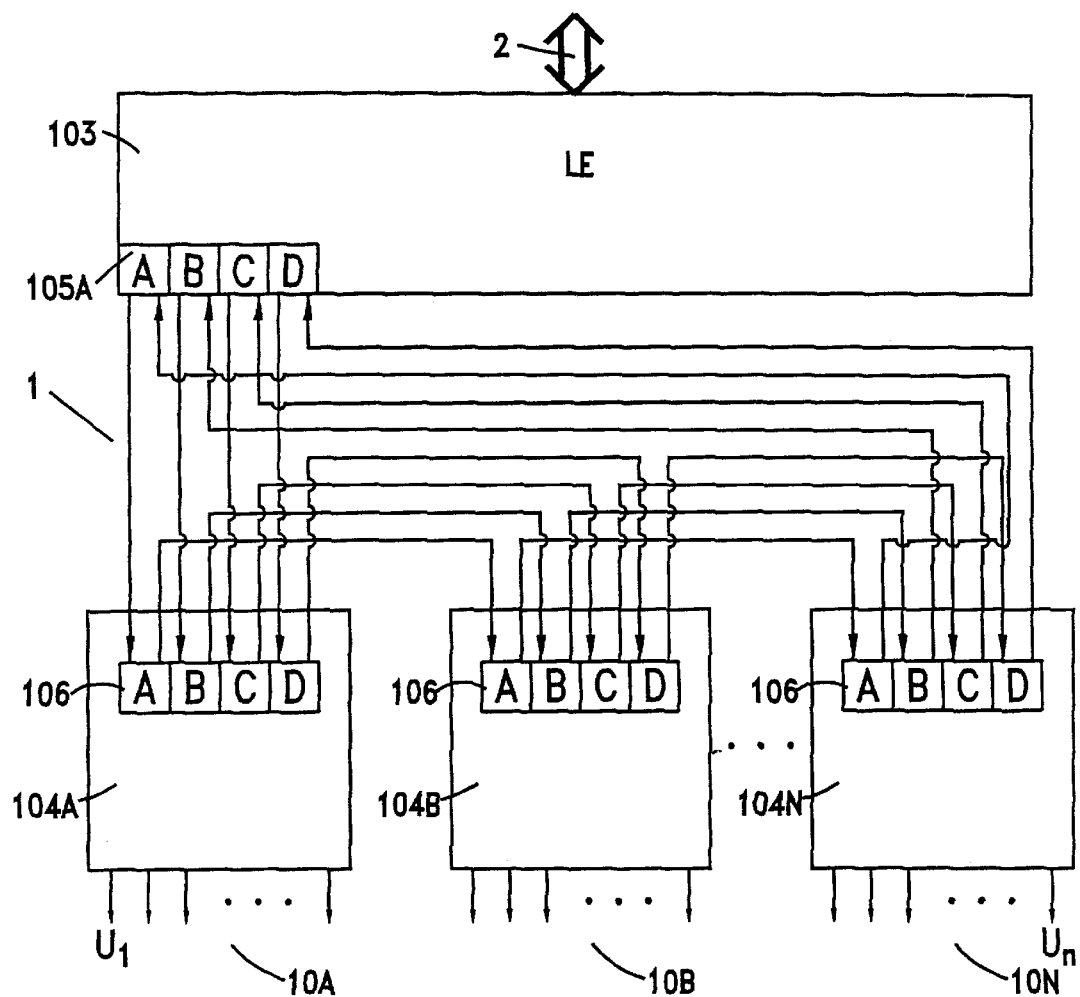
FIG. 2 shows an E1/T1 system according to one embodiment of the invention.

FIG. 2 shows the basic structure of an E1 communication system 1 according to one embodiment of the invention. The Local Exchange box 103 in this simplified example comprises four E1 transceivers 105A–105D. They serve N Access Devices 104A to 104N, and each Access Device comprises four E1 transceivers 106A–106D. The E1 data from the first transceiver 105-A is provided only to the first E1 transceiver 106-A of the first Access Device 104-A. As before, the Access Device 104A selects the data blocks from the frames of the received E1 data that is destined for users 10A of this Access Device, and forwards them each to their respective user Ui. The data blocks identified as addressed to users of another Access Device are "ignored" by the Access Device 104-A, and forwarded from the E1 transceiver 106-A to the E1 transceiver 106-A of the next Access Device 104-B.

Furthermore, some of the blocks that are released, as they are destined to users 10A of the Access Device 104-A, may be now occupied and used for transferring out E1 data from users of Access Device 104-A to another card or to the LE 103. The data blocks are of course grouped in frames, as is standard in the E1 and T1 links. The E1 data is then received by he E1 transceiver 106-A of the next Access Device 104B, in which the same process takes place. The second Access Device 104B then similarly outputs an E1 transmission into an Access Device 104C (not shown), and so on in a chain-like manner. The last Access Device (user interface card) 104N in the chain finally returns the E1 data from its E1 transceiver 106-A to the E1 transceiver 105-A of the Local Exchange 103. Of course, the returned E1 data is different from the data that previously left the transceiver 105-A of the Local Exchange box 103, as each Access Device 104A-104N extracts data blocks from the framed data stream for its users, and possibly occupies some available time slots in frames for outputting data from its users to the LE, and possibly to the telecom trunk (not shown) via links 2. The transceivers 104B–105D operate in the same chain-like manner. For example, E1 data from the E1 transceiver 105B of the LE 103 is first provided to transceiver 106B of the first Access Device 104-A, then forwarded to the E1 transceiver 106B of the next Access Device 104B, and so on until the data arrives at the E1 transceiver 106B of the last Access Device 104N, from which the data is forwarded to the E1 transceiver 105B of the LE 103. The same process occurs with the data from transceivers 103C and 103D. Therefore, in this manner it has been shown that the four E1 transceivers of the LE 103 can serve essentially any number of Access Devices, as the data is forwarded, chain-like, from each Access Device 104 to the next one, and finally from the last Access Device 104N back to the LE 3. In this manner, the E1 data flows through all the Access Devices 104A–104N in the chain, and the data blocks in the E1 frames can be easily distributed to the destined users 10 of the appropriate Access Device, as needed. There is no need for a special mechanism for forwarding data blocks from one Access Device 104 to another Access Device 104Preferably, but not obligatory, the illustrated Access Devices belong to different shelves (Access Systems).

Referring back to FIG. 3, attention will now be focussed on functions of the Access Device.

FIG. 3 shows in more detail the structure of an Access Device 104. For the sake of simplicity, it is assumed that the Access Device 104 comprises only one transceiver (in comparison to the four E1 transceivers 106A–106D in each Access Device 104 of FIG. 2). The line interface 121 of the transceiver section 120 has a receive Rx and transmit Tx ports, 122 and 123 respectively, by which E1 data is received or transmitted respectively. The received E1 frames are provided into the input buffer 137 of the per-channel loop-back unit 124. The per-channel loop-back unit (PCL) 124 analyzes the channels in each received frame, according to information that it receives from the management system (not shown). Such information includes, for example, the channel blocks in each received frame that are destined for the users U1 to Um (generally marked 10) that are supported by this specific Access Device 104. Having received this information, the PCL unit 124 then selects the channel blocks in each received frame that are destined for users 10 of this Access Device 104, and forwards only these data blocks via a buffer-interface 125 into a time-slot interchange switch (TSIS) 126. The TSIS 126 is a switching unit that is provided with information relating to the user destination of each selected data block, and it maneuvers each data block to its user Ui via the user interface circuitry (UIC) 130. Data slots that have user destinations that are not supported by this specific Access Device 104 are not forwarded to the TSIS 126, but they are maneuvered instead to the corresponding data blocks in a corresponding frame at the output buffer 136. The data blocks of the frame at the output buffer 136 are therefore now occupied by data blocks that have been received from the E1 Rx 122 line, but are not destined for users that are supported by this Access Device 104. The data blocks that have been received by Access Device 104 and are destined to users that are supported by this Access Device are extracted from the frame, and the corresponding channels at the frame at the output buffer corresponding to these extracted data blocks are now vacant. If a user Ui wishes to send data via the E1 link, the user provides the data, for example, via a CPE interface (not shown) to the UIC 130 of Access Device 104, which in turn forwards it to the TSIS 126, which forwards it via the TDATA line 140 into the E1 transceiver 137. This data then occupies a data block in a frame in the transmitting buffer 136, or data blocks in several consecutive frames, as is generally necessary. Usually this procedure is symmetrical, i.e., the downstream and upstream data of the same user occupies the same time slot, until the completion of the transfer. The frames from the output buffer 136 are then outputted, in an E1 format, via line 123. According to the invention, line 123 is generally connected to the next Access Device 104, instead of connecting it to a transceiver 105 at the Local Exchange 103, as in the prior art. The only exception is the last Access Device 104 in the chain, the line 123 of which is connected to an E1 transceiver 105 at the Local Exchange 103.

In any specific Access Device 104, selective switches 146, when closed, symbolically indicate that channels in a received frame that are not destined for users 10 of this Access Device 104, are maneuvered to corresponding channels in a frame at the output buffer 136. Selective switches 146, when open, symbolically indicate that channels in a received frame that are destined for users 10 of this Access Device 104 are forwarded to the time-slot interchange switch (TSIS) 126, and from it to the respective users.

The control bus 141, as well as the timing lines 142 and PCM timing bus 148, are used for controlling the proper operation of the Access Device, but they are not within the scope of the invention, as their function is known in the art. It should also be noted that the management system of the card is also not within the scope of the invention, as it is known. Of course, an adaptation of the management system is needed in order to enable it to manage the chain-like connection of the Access Devices. However, this can be carried out easily by a skilled person, upon learning the principle of the invention.

As shown in the embodiment of FIGS. 2 and 3, the invention overcomes the necessity of providing in the Local Exchange box 103 a separate E1 transceiver for each E1 transceiver 106 of the Access Devices 104. According to this main embodiment of the invention, this is done by making a chain of Access Devices 104, in which the first Access Device in the chain provides E1 data that is not destined to one of its users to a next Access Device 104 in the chain, which in turn forwards the E1 data that is not destined to one of its users to a third Access Device 104 in the chain, and so on, until finally providing the E1 link, that now also contains data from users and which are combined in the vacant E1 frames by each Access Device 104, back to the Local Exchange box 103. The route of the data, as shown in the embodiment of FIG. 3, is only one possible example, and relates to an Access Device 104 having only one E1 transceiver 106 (an example which is given for the sake of brevity).

Figure 4:
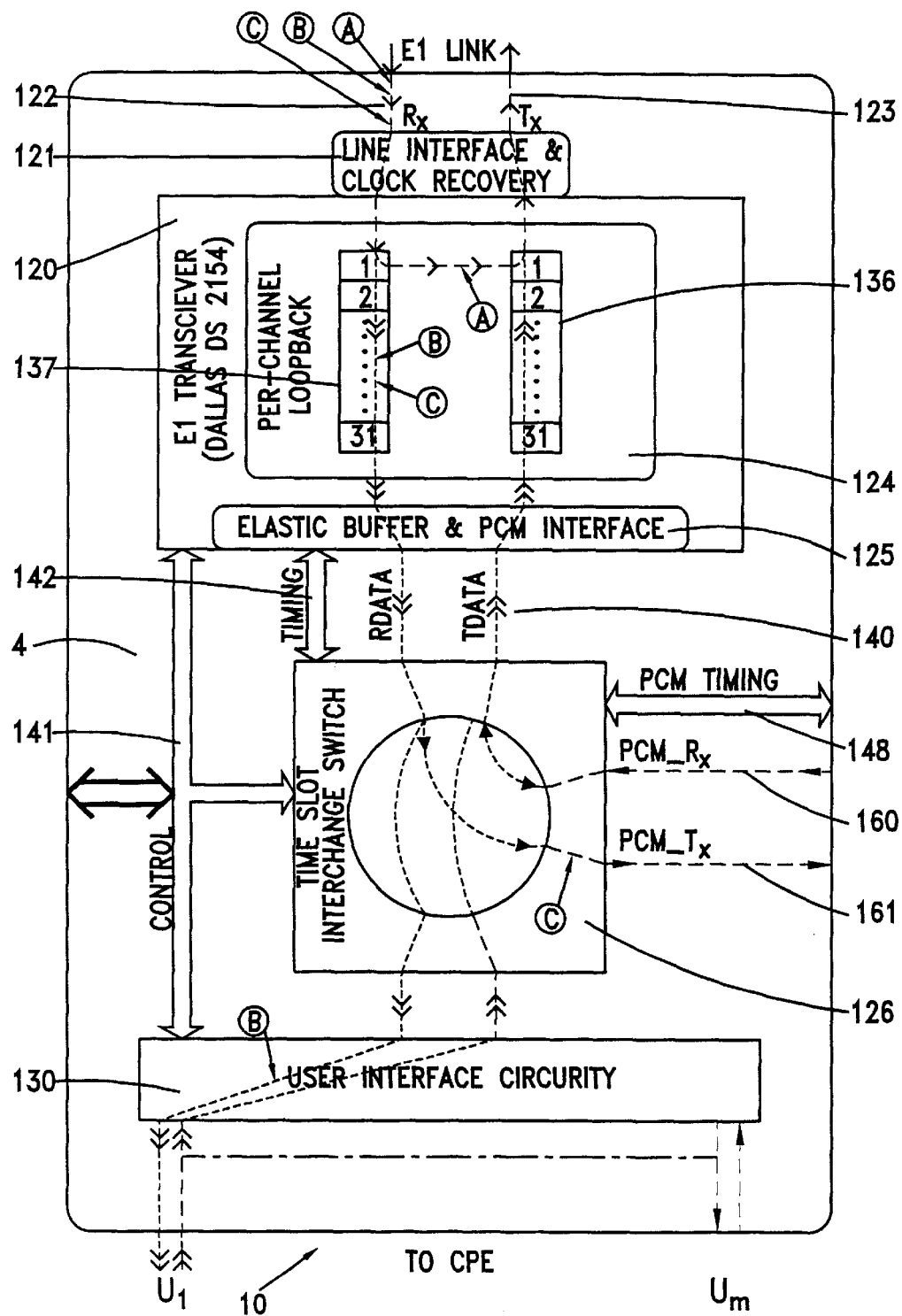
FIG. 4 shows three possible routes of E1/T1 data blocks within one user interface card, according to one embodiment of the invention.

FIG. 4 shows some other possible data routes. The route marked by A shows the case of FIGS. 2 and 3, in which the E1 transceiver forwards data block no. 1, together with additional data blocks that have been accumulated at the output buffer 136, to the next Access Device. The route marked as B shows the case in which selected channels are forwarded to one or more of users 10 of this Access Device. This case has also been described above with reference to FIGS. 2 and 3.

The route marked C illustrates an option of forwarding some data blocks to other Access Devices in the same shelf, and will be explained with reference to FIG. 5.

Figure 5:
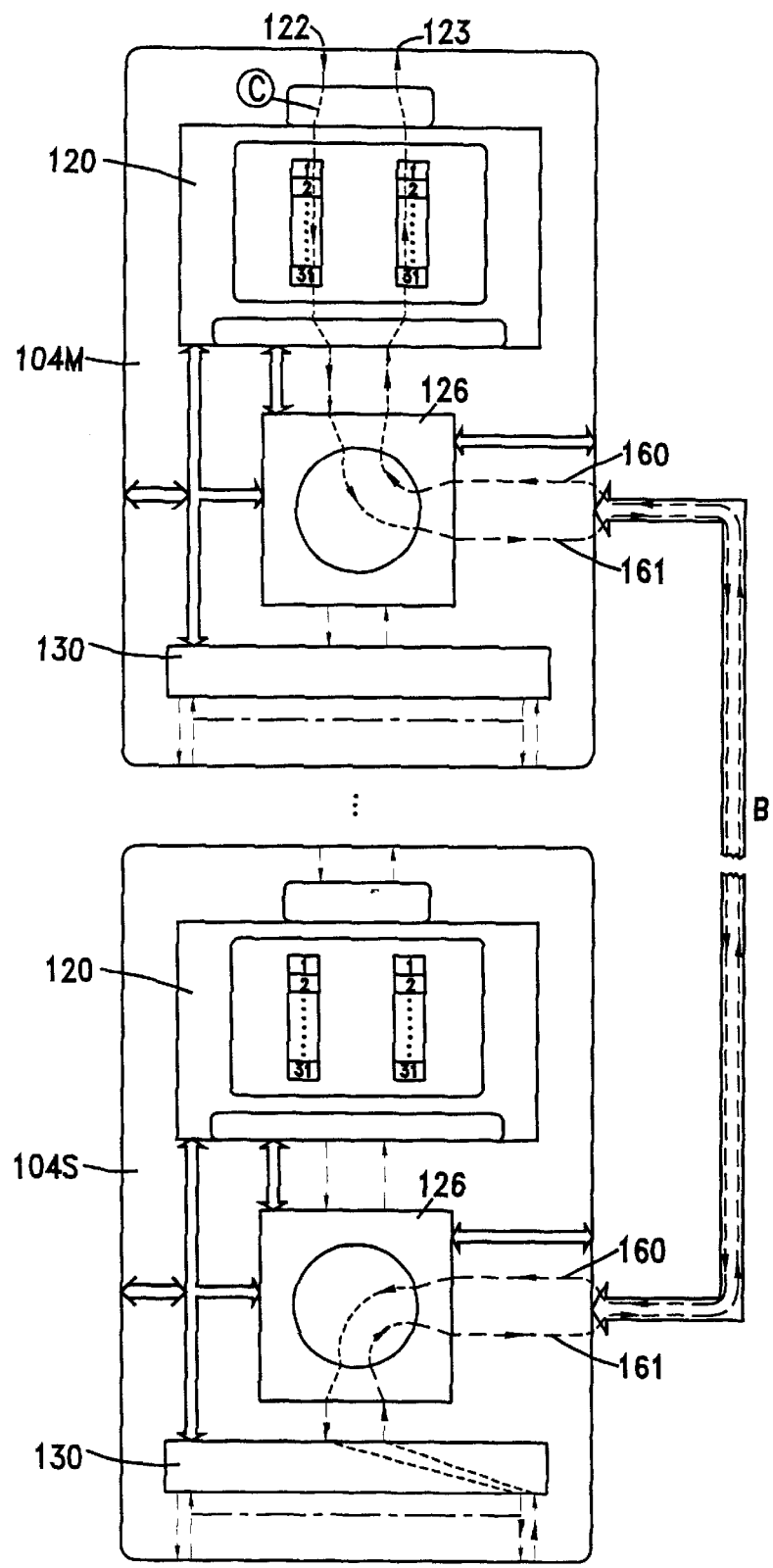
FIG. 5 shows a route for E1/T1 data blocks between two user interface cards within a common shelf, according to one embodiment of the invention

In another embodiment of the invention shown in FIG. 5, several user Access Devices 104 in one location(two of them are shown)are grouped together in a shelf (AS). All the user Access Devices 104 of a same shelf share the same bus marked B. In this case, the E1 data is received by a transceiver 120 of only the first Access Device in the AS. This Device will be called a master and marked 104M. The transceiver 120 of the Access Device 104M in the shelf is provided with the data block numbers that are destined to users of all Access Devices 104 in the AS, not only the users of the first Access Device 104M, itself. The transceiver 120 then selects the said data blocks and forwards them to the TSIS 126 of this card. As before, the TSIS 126 is provided with the information for forwarding the selected data blocks to users of the same Access Device 104, and accordingly does so, as described before with respect to the embodiments of FIGS. 2 and 3. The data blocks that are not destined to users of the first Access Device 104M in the shelf are forwarded via the line PCM Tx 161 to the time-slot interchange switch 126 of the next Access Device 104 (slave "S") in the shelf, as marked by route C. The TSIS 126 of the next Access Device in the shelf similarly selects the data blocks that are destined to user(s) of this Access Device and maneuvers them to the appropriate user(s) of this Access Device, and forwards the rest of the data slots to the TSIS 126 of the next Access Device 104 via the PCM Tx line 161. On the other hand, if data is received from a user into any Access Device 104 in the shelf, the data is provided by the user interface circuitry 130 into the TSIS 126 of this Access Device 104 which, if not the first Access Device (M) in the shelf, forwards said data via the PCM Tx line 161 into the PCX Rx line 160 of the previous Access Device 104. The same process is repeated in the said previous Access Device 104, until the data slot reaches the TSIS 126 of the first Access Device in the shelf. The TSIS 126 of the first Access Device 104M in the AS then maneuvers this data block to the E1 transceiver 106 of the first Access Device 104M, which in turn outputs the data from its output buffer 136 into the E1 link via the Tx line 123. FIG. 5 thus shows in more detail the data flow of route "C" between several Access Devices 104 in a single shelf.

Figure 6:
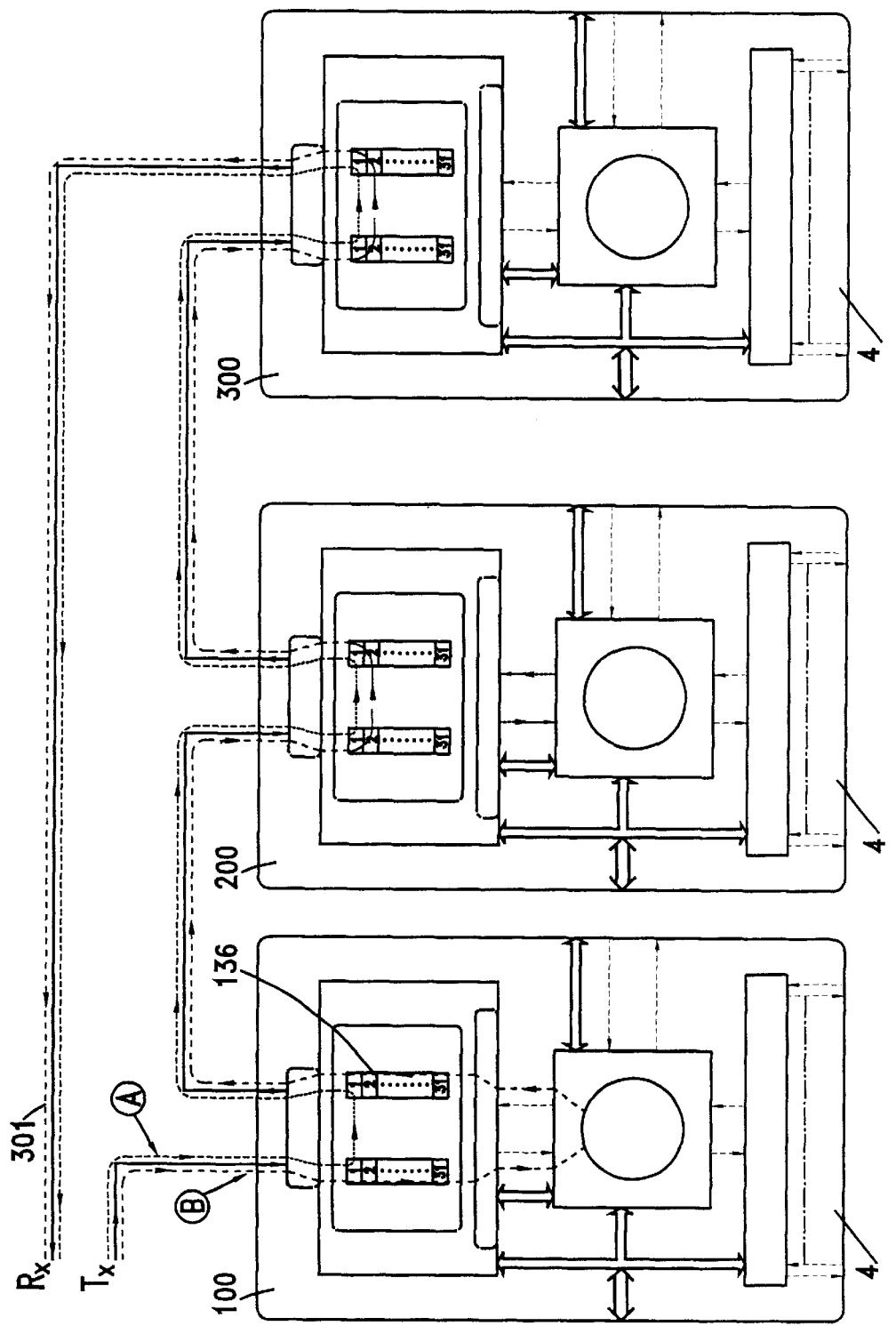
FIG. 6 shows a route for E1/T1 closed loop data stream between three Access Devices, according to one embodiment of the invention.

FIG. 6, which may be considered a partial and more detailed illustration of FIG. 2, shows E1 data flow between several shelves (Access Systems), according to one embodiment of the invention. Access Devices 100, 200, and 300 are the first Access Devices 104 in three separate Access Systems, respectively. In this case, the data from the E1 link is first provided into the first Access Device 100 of the first shelf, that in turn selects all the data blocks for users within the shelf (either in the same Access Device 104 or in another Access Device 104 within the same shelf), which are forwarded as described above with respect to routes B and C. Data blocks that are not destined to users within the said shelf are forwarded into a next shelf via the output buffer 136 and the E1 link—route "A". The data thus flows, between the Access Systems, until returning to the Local Exchange 103 via line 301.

As shown, the invention provides a method and structure for distributing E1 or T1 data between a plurality of users. The number of users of the system can be easily increased. The users may be connected to one Access Device 104, to several Access Devices within the same Access System, or to several Access Devices within separate Access Systems. In any case, the number of active E1 transceivers in the Local Exchange 103 can be equal to or less than the total number of active transceivers in all the Access Devices. The method is applicable both to T1 links and E1 links. As said, the system can be easily expanded to serve an increased number of users.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method of exchanging data streams between a local exchange and a number of access devices for serving a plurality of destination users, the method comprising steps of:

providing a local exchange capable of generating at least one output data stream and of receiving at least one corresponding input data stream for carrying data blocks respectively relevant to one or more of the access devices;

providing two or more said access devices, each permitting passage there-through of at least one data stream carrying data blocks, being capable of extracting, from said at least one data stream, data blocks relevant to this particular device and of introducing there-into data blocks to be transmitted from this particular device to the local exchange; and arranging one or more close loop data streams, each being intended for serving said two or more access devices using one of said output data streams and the corresponding input data stream of the local exchange, by causing the output data stream leaving the local exchange to pass through said two or more access devices in a chain-like manner and return to the local exchange as the input data stream.

2. The method according to claim 1, wherein each of said data streams is a stream comprising data frames carrying the data blocks arranged in time slots.

3. The method according to claim 2, wherein a pair comprising one said input data stream and one said corresponding output stream forms one E1 link.

4. The method according to claim 2, wherein a pair comprising one said input stream and one said corresponding output stream forms one T1 link.

5. The method according to claim 1, wherein the step of arranging one or more close loop data streams is performed by chain-like interconnecting the access devices situated in different access systems.

6. The method according to claim 1, further comprising a step of forwarding the extracted data blocks from each said access device to the respective destination users, and a step of receiving, at each said access device, data blocks to be transmitted from the respective destination users to the local exchange.

7. The method according to claim 6, wherein said step of forwarding the extracted data blocks to destination users comprises a sub-step of passing thereof from at least one of said access devices named a master device via a slave access device to the destination users associated therewith, as well as a sub-step of receiving data blocks intended for transmission from the destination users associated with the slave device; thereby increasing a number of the destination users served by the master device.

8. A system for exchanging data streams between a local exchange and a number of access devices for serving a plurality of destination users, the system comprising:

a local exchange having at least one transceiver capable of generating one output data stream and of receiving a corresponding input data stream for carrying data blocks respectively relevant to one or more of the access devices;

two or more of said access devices, wherein each particular access device has at least one transceiver permitting passage through the device of a data stream carrying data blocks, the device being capable of extracting from the stream data blocks relevant to the particular device, and of introducing into the stream data blocks to be transmitted from the particular access device to the local exchange; said two or more access devices being arranged in at least one chain, each of the chains to be served in a close loop by at least one of said transceivers of the local exchange, said close loop being formed by connecting the output of the transceiver of the local exchange to the input of the transceiver of a first device in the chain, the output of the transceiver of a last device in the chain is connected to the input of the transceiver in the local exchange, wherein the output of the first device in the chain being connected to the input of the transceiver of a last device in the chain either directly or in a chain-like manner via intermediate access devices if present in the chain.

9. The system according to claim 8, wherein said at least one chain is composed from chain-like interconnected said access devices situated in different access systems.

10. The system according to claim 8, wherein the access device is a user interface card, and the access system is an access shelf adapted to accommodate a number of the user interface cards.

11. The system according to claim 8, designed for E1 multiplexing system.

12. The system according to claim 8, designed for T1 multiplexing system.

13. The system according to claim 8, wherein said access device comprises:

a block of per-channel loop-back comprising an input buffer for receiving at least one data frame, an output buffer for storing and transmitting at least one frame, means for extracting from the input buffer relevant data blocks from one or more time slots, means for forwarding the contents of the input buffer to the output buffer after extraction, and means for embedding, into vacant time slots of the output buffer, data blocks received by the access device from destination users for transmission;

a time-slot interchange switch unit for routing the extracted data blocks to the destination users and routing data blocks from the destination users to the output buffer block.

14. The system according to claim 8, wherein at least one of said access devices in the chain constitutes a master device and is provided with one or more additional access devices serving destination users and constituting slave devices; said master device being adapted to extract and transfer to any particular slave access device data blocks intended to destination users of the particular slave device, as well as to receive data blocks intended for transmission from destination users of the slave devices.

15. The system according to claim 14, wherein said master device is adapted to communicate with said one or more slave devices via a time slot interchange switch.

* * * * *